(12) United States Patent
Hibbard (10) Patent No.: US 7,494,324 B2
(45) Date of Patent: Feb. 24, 2009

(54) MEMBER FOR POTENTIAL EQUALISING

(75) Inventor: Paul Hibbard, Southampton (GB)

(73) Assignee: Vestas Wind Systems A/S, Randers (DK)

( * ) Notice: Subject to any disclaimer, the term of this patent is extended or adjusted under 35 U.S.C. 154(b) by 226 days.

(21) Appl. No.: 10/576,071

(22) PCT Filed: Oct. 31, 2003

(86) PCT No.: PCT/EP03/12134

§ 371 (c)(1),
(2), (4) Date: Apr. 14, 2006

(87) PCT Pub. No.: WO2005/050808

PCT Pub. Date: Jun. 2, 2005

(65) Prior Publication Data

US 2007/0074892 A1 Apr. 5, 2007

(51) Int. Cl.
*H01B 7/08* (2006.01)
(52) U.S. Cl. .................. 416/230; 416/229 A; 416/226; 416/241 A
(58) Field of Classification Search ................. 416/230, 416/229 A, 226, 241 A
See application file for complete search history.

(56) References Cited

U.S. PATENT DOCUMENTS

| | | | | |
|---|---|---|---|---|
| 4,944,655 A | * | 7/1990 | Merz | ............ 416/61 |
| 5,800,129 A | * | 9/1998 | Lorin De La Grandmaison et al. | ............ 416/224 |
| 5,863,181 A | * | 1/1999 | Bost et al. | ............ 416/224 |
| 6,102,662 A | * | 8/2000 | Bost et al. | ............ 416/224 |
| 6,457,943 B1 | | 10/2002 | Møller et al. | |
| 2006/0280613 A1 | | 12/2006 | Hansen | |

FOREIGN PATENT DOCUMENTS

| | | |
|---|---|---|
| DE | 44 45 899 | 6/1996 |
| EP | 1 154 537 | 11/2001 |
| WO | WO 01/77527 | 10/2001 |

OTHER PUBLICATIONS

Patent Abstracts of JP; vol. 2002, No. 09, Sep. 4, 2002 (JP 2002 141192); Ota Gijutsu: "Lighted-protection ion dissipation device for wind power generation equipment".

* cited by examiner

*Primary Examiner*—Igor Kershteyn
(74) *Attorney, Agent, or Firm*—Stites & Harbison PLLC; Douglas E. Jackson (57) ABSTRACT

A member for potential equalising in a wind turbine blade between a first conducting member, such as a member comprising carbon fibres, and a second conducting member, such as a lightning conductor is provided. Furthermore, methods for manufacturing of such members for potential equalising are provided. The member for potential equalising comprises a first contact part suitable for connection to a conducting member comprising carbon fibres, a second contact part and an electrical conductor between the contact parts and the first contact part, wherein the first contact part is shaped substantially as a ribbon.

41 Claims, 8 Drawing Sheets

MEMBER FOR POTENTIAL EQUALISING

TECHNICAL FIELD OF THE INVENTION

The present invention relates to potential equalising in a wind turbine blade between conducting members, such as a conducting member comprising carbon fibres and a lightning conductor. In particular, the present invention relates to a member for potential equalising in a wind turbine blade between a first conducting member, such as a member comprising carbon fibres, and a second conducting member, such as a lightning conductor.

BACKGROUND OF THE INVENTION

Structures prone to be stroked by lightning, such as wind turbine blades, are typically equipped with a lightning conductor to conduct at least most of the current of a lightning through or past the structure to the ground without damaging sensitive parts of the structure.

If other conducting material than the lightning conductor is present in the structure, flashover between the other conducting material and the lightning conductor may take place if the potential difference between the lightning conductor and the other conducting material becomes sufficiently great. Providing a means for potential equalising may prevent this or at least the risk of flashover should be greatly reduced.

Means for potential equalising typically consist of one or more electrically conducting cords between the lightning conductor and the other conducting material. However, when the other conducting material is not a very good conductor in one or more directions, a sufficiently good potential equalising to prevent flashover cannot be realised directly by an electrically conducting cord. This is particularly the case for wind turbine blades comprising carbon fibres, e.g. as reinforcement fibres.

Carbon fibres in a composite material will typically conduct electricity considerably worse orthogonal to the length of the fibres compared to parallel to the length of the fibres. This is mainly due to relatively high contact resistance and low contact area between the fibres orthogonal to the length direction. To realise potential equalising, a good electrical contact needs to be established between the members to be equalised. Due to the nature of the carbon-fibres, this may typically not be realised with a point contact to an electrical cable.

Generally speaking only an infinitesimal current needs to be transferred to realise the potential equalising. On the other hand, in the case of conduction of lightning in or near a wind turbine blade, conducting parts, which may be hit directly by lightning, should be connected to a lightning conductor with potential equalising members, which are capable of transferring the current of a lightning. The current of a lightning may be greater than 100 kA in short periods of time, i.e. a completely different situation compared to the transport of the infinitesimal currents needed for potential equalising.

OBJECTS OF THE INVENTION

It is an object of the invention to provide a member for potential equalising between conducting members of a wind turbine blade with an improved electrical contact between said member for potential equalising and at least one of said conducting members.

It is a further object of the invention to provide a method of manufacturing of said member for potential equalising, which is easy to use.

DISCLOSURE OF THE INVENTION

The above and more objects are individually or in combination realised by the invention as described in figures, preferred embodiments and claims.

In a first aspect, the present invention provides a member for potential equalising between a first conducting member and a second conducting member of a wind turbine blade, comprising
 an electrical conductor
 a first contact part for providing a potential equalising connection between said first conducting member of said wind turbine blade and said electrical conductor,
 a second contact part for providing a potential equalising connection between a second conducting member of said wind turbine blade and said electrical conductor, wherein said first contact part is shaped substantially as a ribbon and said first conducting member comprises carbon fibres.

This and further aspects within the inventive concept are discussed further in the following and exemplified in a number of non-limiting preferred embodiments with reference to the figures.

BRIEF DESCRIPTION OF THE DRAWINGS

The invention will be explained more detailed below with reference to particularly preferred embodiments as well as the drawings, in which.

| TABLE FOR IDENTIFICATION | |
|---|---|
| Number | Description |
| 2 | Member for potential equalising |
| 4 | First conducting member |
| 6 | Second conducting member |
| 8 | Wind turbine blade |

-continued

TABLE FOR IDENTIFICATION

| Number | Description |
|---|---|
| 10 | Electrical conductor |
| 11 | Rolled up section of electrical conductor |
| 12 | First contact part |
| 14 | Second contact part |
| 16 | Further contact part |
| 20 | Conducting metal ribbon |
| 22 | Contact-enhancing layer |
| 24 | Cover layer |
| 26 | Internal space |
| 30 | Lightning conductor cable |
| 40 | Leading edge side |
| 42 | Trailing edge side |
| 44 | Wind turbine blade spar |
| 46 | Final carbon fibre slab |
| 48 | Clamp |
| 50 | Reinforcement comprising carbon fibres |
| 52 | Support member |
| 54 | Wind turbine blade |
| 56 | Lightning conductor |

DESCRIPTION OF THE DRAWINGS

Figure 1:
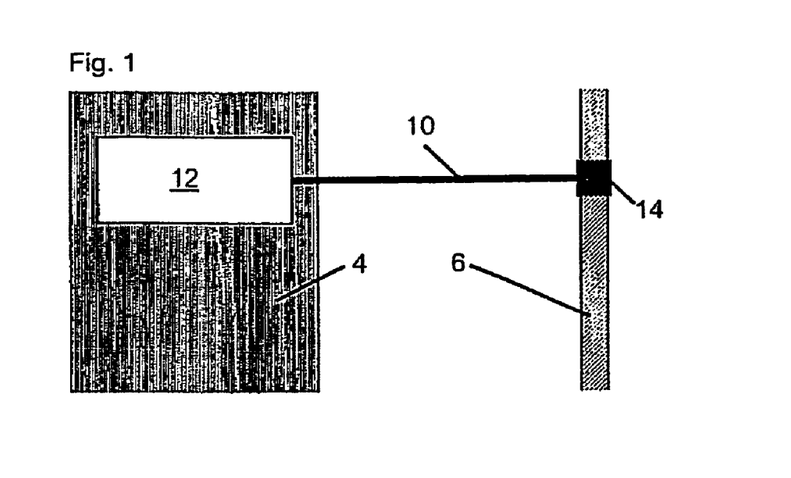
FIG. 1 shows two conducting members potential-equalised with a member for potential equalising.

In FIG. 1, a typical use-situation where the member for potential equalising 2 according to the invention is shown schematically. A first conducting member 4, such as a fibre-reinforced plastic comprising conducting fibres, such as carbon fibres with a main orientation indicated by the direction of the hatching, is positioned near a second conducting member 6, such as a lightning conductor. The conducting members may e.g. be integrated in a wind turbine blade.

If a lightning is conducted through one of the conducting members, there is a risk that a flashover from that conducting member to the other conducting member will take place if the potentials of the two conducting members 4, 6 is very different. Flashover is, however, highly undesired, as it may introduce considerable damage to a conducting member not suited for carrying a lightning. Particularly, conducting members comprising carbon fibre, such as the first conducting member 4, are typically not suited for carrying a lightning.

Therefore, a potential equalising member 2 is applied between the conducting members 4, 6 to provide potential equalising between the conducting members to ensure that the potential of the two members is approximate the same. Typically, several members for potential equalising will be distributed along the length of the wind turbine blade. The lightning current should therefore become distributed between the conducting members corresponding to the conductivity of the members. As the conductivity of a lightning conductor is several orders of magnitude greater that the conductivity of other conducting members present in the wind turbine blade, most of the lightning current should be conducted through the wind turbine blade via a dedicated lightning conductor. Thereby the risk of flashover and introduction of significant damage to other conducting members is greatly reduced and may be completely removed.

The member for potential equalising shown in FIG. 1 comprise an electrical conductor 10, which connects the first contact part 12 and the second contact part 14. The first contact part is particularly suited for being connected to conducting members comprising conducting fibres, such as carbon fibres, whereas the second contact part shown in FIG. 1 is a clamp for connecting the electrical conductor to a lightning conductor cable. Many other embodiments of members for potential equalising, contact parts and electrical conductors within the inventive idea of the present invention are described below.

Figure 2:
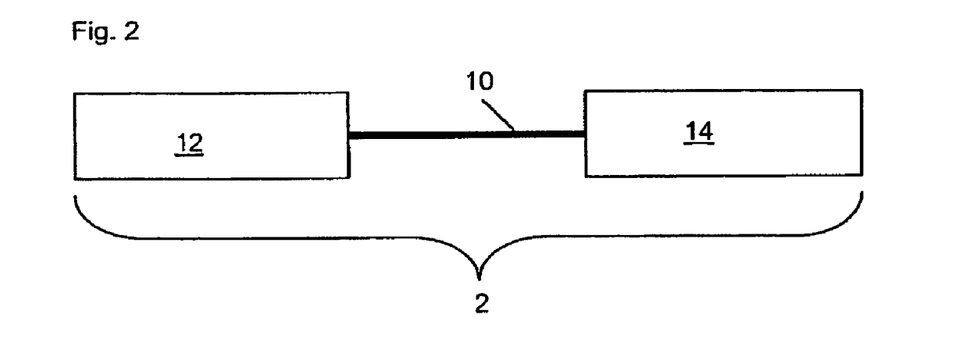
FIG. 2 shows a member for potential equalising.

In FIG. 2, a member 2 for potential equalising is shown. The member for potential equalising comprises a first contact part 12 and a second contact part 14 both connected to an electrical conductor 10. In use, the first contact part 12 is connected to a first conducting member and this first conducting member is particularly difficult to realise a good electrical contact with or a good transverse conducting within. The first conducting member may e.g. comprise conducting fibres such carbon fibres. To ensure a sufficiently good contact between the first contact part and the first conducting member in use, the first contact member is prepared for the contact to the first conducting member by being shaped substantially as a ribbon. If the first conducting member comprising carbon fibres, this should ensure a large contact area to the individual surface carbon fibres and a contact with a large number of carbon fibres. As the conductivity of carbon fibres transverse to the length direction of the fibre is relatively bad, the combination of a large contact area and contact with a large number of carbon fibres in the transverse direction to the length of the fibres will greatly enhance the potential equalising.

The conducting members to be potential-equalised may for example be metallic conductors or other electrically conducting material, such as carbon fibres, or a composite material comprising one or more conducting elements, such as carbon fibre reinforce plastic optionally comprising further fibres such as glass fibres. The conducting members are hence typically lightning conductors, actuators e.g. for a brake or a tip, a sensor cable, support members comprising carbon fibres, reinforcement strips comprising carbon fibres, blade walls comprising carbon fibres, etc.

Even though a member for potential equalising according to the present invention may be used for potential equalising of metallic members, a member for potential equalising according to the present invention is particularly suitable for potential equalising between a the first member comprising carbon fibres and a second conducting member.

Figure 3:
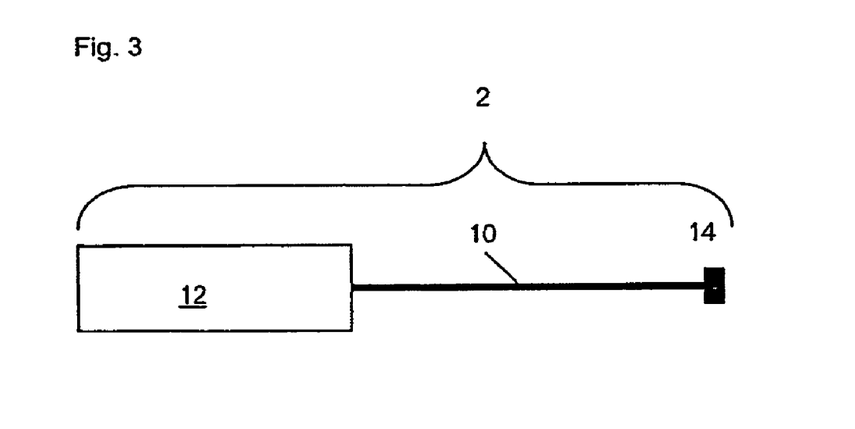
FIG. 3 shows a member for potential equalising having a clamp in the second contact part.

The second contact part 14 may be substantially equivalent to the first contact part as shown in FIG. 2 as well as any other of the embodiments and preferred embodiments of the first contact part described herein. However, in a preferred embodiment, the first contact part 14 may constitute a clamp for connection to a second conducting member as shown in FIG. 3 or a part of the electrical conductor may be prepared or suitable for connection to an optionally external clamp. By an external clamp is meant a clamp that is not necessarily fixed to the member. This embodiment may e.g. be particularly advantageous if the second conducting member is a metallic conductor such as a lightning conductor cable.

Figure 4:
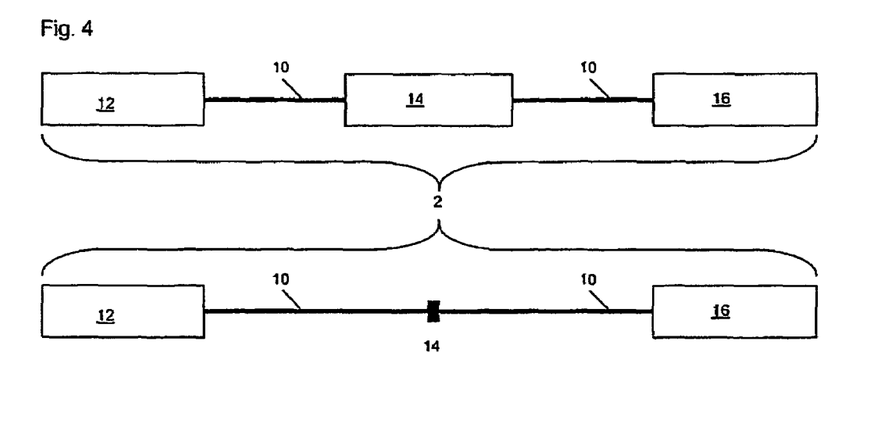
FIG. 4 shows members having a further contact part.
Figure 8:
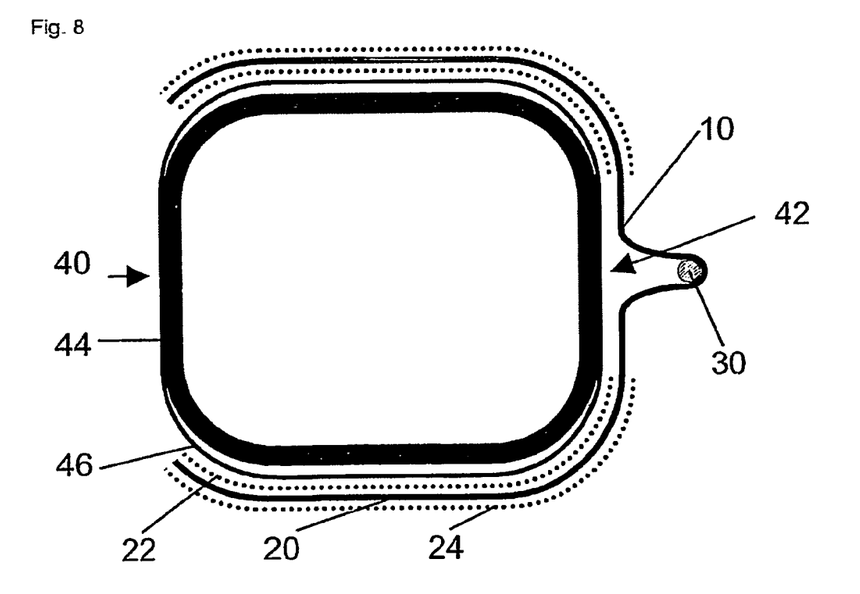
FIG. 8 shows a preferred embodiment of a member for potential equalising of a spar in a wind turbine blade.

FIG. 4 shows two members 2 for potential equalising having a further contact part 16 for providing a potential equalising connection to a further conducting member The member for potential equalising shown in FIG. 4 top has three substantially equivalent contact parts 12, 14, 16. This embodiment is particularly advantageous in connecting a number of conducting members comprising material with high contact resistance, such as carbon fibres. The member for potential equalising shown in FIG. 4 bottom has two contact parts 12, 16 of the type described as the first contact part and one contact part 14 of the clamp-type or suitable to be connected to a clamp. An example of an application of such a member for potential equalising is shown in FIG. 8.

A member for potential equalising may have more than one further contact parts, such as two, three, four or more further contact parts, corresponding to a total of four, five, six or more contact parts, respectively. The further contact parts may have any of the types for the first and the second contact parts described herein irrespective of the actual type of the first and the second contact part as well as the types optional other additional contact parts of that member for potential equalising having a further contact part.

Figure 5:
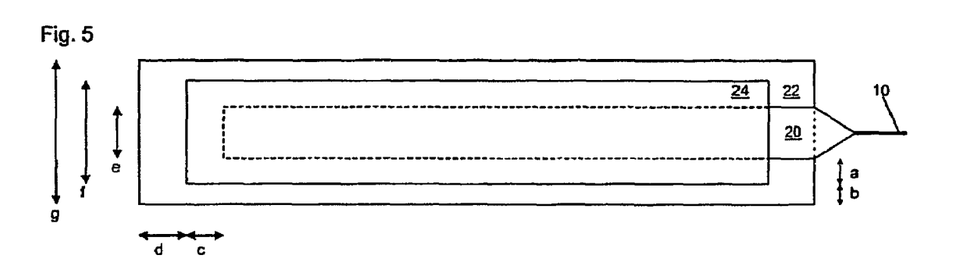
FIG. 5 shows a preferred embodiment of a contact part.
Figure 6:
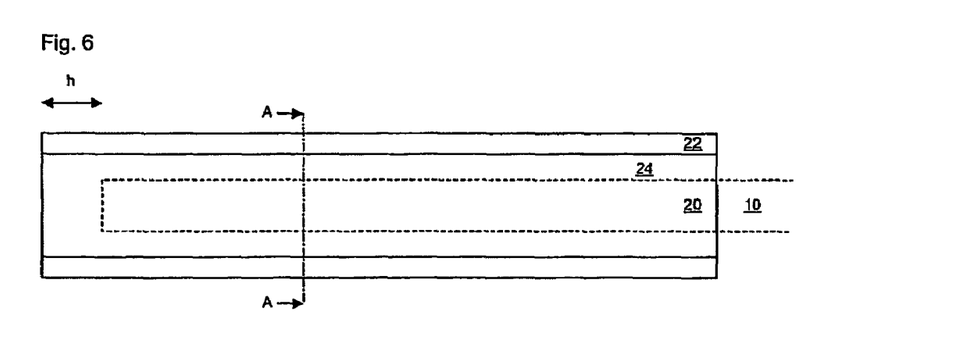
FIG. 6 shows another preferred embodiment of a contact part.

In FIG. 5 and FIG. 6 are shown some details of preferred embodiments of a first contact part. The first contact part is shaped substantially as a ribbon. Preferably, it comprises a conducting metal ribbon 20, but other materials, such as e.g. carbon fibres or a composite comprising carbon fibres, may take the place or be combined with the metal ribbon This metal ribbon may be relatively stiff, particularly if it should be able to transfer a considerable current (see below), however, in a preferred embodiment, the metal ribbon is a flexible sheet or a flexible mesh of metal. The advantage of a flexible metal ribbon is that the ribbon is more likely to conform to the shape of the conducting member and hence is less likely to create a local bending of carbon fibres of the first conducting member, which may lead to reduction of stiffness and/or strength of the first conducting member. Furthermore, a flexible ribbon will typically have a greater contact area to the carbon fibres than a stiff metal ribbon.

To realise a large contact area, it is preferred that the width of the metal ribbon is more than 1 cm. On the other hand, a too wide metal ribbon may be difficult to apply without the formation of wrinkles on a surface, and it is therefore more preferred that the width be between 2 to 30 cm. It was found that the best results were obtained when the conducting metal ribbon had a width of between 3 to 10 cm, such as 5 cm.

The thickness and the cross-section area of the metal ribbon depend on the composition of the metal as well as on the wind turbine blade design. To give a rough indication of the relevant size level it may be noted that a thickness of about 0.25 to 1 mm, such as about 0.5 mm, or a cross-section area of between 15 to 5 $mm^2$, such as about 6 $mm^2$, is suitable for a copper metal ribbon if only a limited current is expected to pass through the connection (i.e. only potential equalising, not conducting of lightnings).

To enhance the contact between the metal ribbon 20 and the first conducting member, the member for potential equalising may be equipped with a contact-enhancing layer 22 to be positioned between the metal ribbon 20 and the first conducting member when the member for potential equalising is applied. The contact-enhancing layer should primarily enhance the electrical contact and the potential equalising between the metal ribbon and the first conducting member. However, in another aspect of the invention, the contact-enhancing layer may furthermore or instead provide a better mechanical and/or chemical connection between the metal ribbon and the first conducting member In another aspect, the contact-enhancing layer 22 may prevent direct contact between the metal ribbon 20 and the conducting member and hence protect the metal ribbon and/or the conducting member from reacting with each other.

In a preferred embodiment, the contact-enhancing layer 22 extends beyond the metal ribbon 20 in at least one direction. In FIG. 5 and FIG. 6, the contact-enhancing layer extends beyond the metal ribbon in the upward, the downward and the left direction. The size of the extent is indicated as the combined lengths of the arrows a+b and c+d, respectively. The size of the extent does not need to be the same in all of the directions. The contact part 14 of the member for potential shown In FIG. 4 top typically only extends beyond the metal ribbon in the upward and/or the downward direction. The size of the extent of the enhancing layer is typically in the order of the width of the metal ribbon, but it may vary considerably. Typical values of the extent of the contact-enhancing layer are between 0 to 4 times the width of the metal ribbon, preferably between 1 to 2.5 times the width of the metal ribbon. Typically numerical values of the extent are between +15 cm to 0 cm, such as about 10 cm.

In another preferred embodiment, the first contact part 12 further comprises a cover layer 24. The cover layer is connected to the side of the conducting metal ribbon, which will be oriented away from the first conducting member when the contact part is attached to the first conducting member. In other words, if the first contact part has both a contact-enhancing layer and a cover layer, these layers should be connected to the opposite sides of the conducting metal ribbon.

The cover layer may act towards one or more of the following: A smoother upper side of the first contact part a better potential equalising, mechanical and/or chemical protection of the conducting metal ribbon and/or the optional contact-enhancing layer. In a preferred embodiment, the cover layer 24 extends beyond the metal ribbon 20 in at least one direction. In FIG. 5 and FIG. 6, the cover layer extends beyond the metal ribbon in the upward, the downward and the left direction. The size of the extent is indicated by the lengths of the arrows a and c, respectively. The size of the extent does not need to be the same in all of the directions. The contact part 14 of the member for potential shown in FIG. 4 top will typically only extend beyond the metal ribbon in the upward and/or the downward direction. The size of the extent of the cover layer is typically in the order of the width of the metal ribbon, but it may vary considerably. Typical values of the extent of the cover layer are between 0 to 3 times the width of the metal ribbon, preferably between 1 to 2 times the width of the metal ribbon. Typically, numerical values of the extent are between 10 cm to 0 cm, such as about 5 cm.

In a preferred embodiment as those shown in FIG. 5 and FIG. 6 of a contact part of the member 2 for potential equalising comprising a contact-enhancing layer 22 and a cover layer 24, the cover layer 24 extends beyond the conducting metal ribbon 20 in at least two directions in the plane of the conducting metal ribbon 20. And the contact-enhancing layer 22 extends beyond the cover layer 24 in the same two directions. As an example, these directions correspond to the upward and the downward direction in FIG. 5 and FIG. 6, respectively. The advantage of this embodiment is indicated in FIG. 7, where a cross section along a part of the A-A line in FIG. 6 is shown.

It is evident from FIG. 7A that the change in thickness of the member for potential equalising is more smooth when the described differences in width are used compared to what would be the case if the edges of elements 20, 22 and 24 were positioned directly above each other (see below). This is particularly advantageous for conducting member comprising carbon fibres, where the strength and/or stiffness to some extent depends on the straightness of the carbon fibres. A narrow, thicker ribbon-shaped contact part is likely to cause considerably more disturbance in the straightness of the carbon fibres. Similarly, a corresponding situation (i.e. with a more smooth change in thickness) may arise if the cover layer 24 extends beyond the contact-enhancing layer.

The internal space 26 may e.g. be filled with resin, or the metal ribbon may be shaped to reduce the size of the space.

Figure 7:
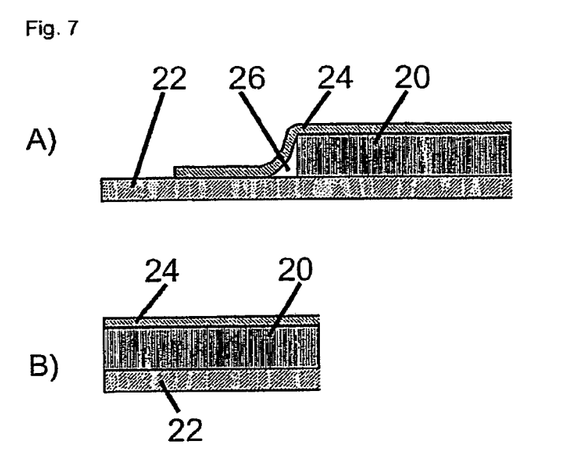
FIG. 7 shows a detail of a cross-sectional view of a contact part.

FIG. 7B shows an example of a first contact member having the edges of the contact-enhancing layer 22, the conducting metal ribbon 20 and the cover layer 24 right on top of each other. This embodiment may e.g. be useful when the first conducting member is relatively rigid and hence less sensitive towards indention by the first contact part.

The materials of the cover layer and/or the contact-enhancing layer 22 are preferably a highly flexible and conductive material. In a preferred embodiment, the contact-enhancing layer comprises a loose non-woven material such as a web, a veil or a fleece material, whereas other materials having similar properties may also be used. The flexibility and conductivity are appreciated as it enhances the electrical contact between the contact part and the conducting member. The loose non-woven nature of the preferred material for the contact-enhancing layer should ensure that the surface of the conducting member is conformed closely by the contact part. Furthermore, an open nature of the contact-enhancing layer is likely to reduce the contact resistance even further.

The cover layer 24 and/or the contact-enhancing layer 22 may be at least partially impregnated with a resin, such as prepreg or a semi-preg. Experimental work has indicated that a semi-preg impregnated at one side only (i.e. a single-sided semi-preg) is particularly advantageous in ensuring a reproducible connection. In a particularly preferred embodiment, the contact-enhancing layer 22 as well as the cover layer 24 are single-sided semi-pregs, preferably both oriented with the impregnated side facing towards the conducting member. This ensures a stable and reproducible contact part with very good electrical properties.

The resin of such impregnated or semi-impregnated layer should be compatible to the main resin or resins used in other parts of the wind turbine blade. Preferably, the resin is substantially the same as the main resin used for preparing the conducting members of the blade to be connected by the members for potential equalising, such as e.g. a polyester-based resin or epoxy-based resin, preferably an epoxy-based resin.

The electrical conductor 10 may have a number of different designs including a simple metallic cable, however, it is preferred that the electrical conductor is a conducting metal ribbon. This will substantially simplify the design of the member for potential equalising as a conducting metal ribbon 20 of a contact part may be an integrated part of and/or an extension of the conducting metal ribbon of the electrical conductor 10. By integrated is meant that one piece of metal is used, i.e. one sheet or mesh of metal extends from within a first contact part to (optionally to within) a second contact part Hence, the possible problem of creating a sufficiently good contact between the electrical conductor 10 and the conducting metal ribbon 20 may be avoided.

The conducting metal ribbon 20 and the electrical conductor 10 may in principle be made from any conducting material or combination of materials. However, it is preferred that the material is a good conductor and relatively inert towards chemical attack from other materials present, such as the resin, as well as air and water. Preferably at least one of the conducting metal ribbons 20 and the electrical conductor 10 comprise a metal or a combination of materials wherein at least one component is selected from the group consisting of copper, steel, stainless steel, aluminium, nickel, chromium, tin and silver. The most preferred material being copper due to the very high conductivity and copper being a noble metal.

The cover layer 24 and the contact-enhancing layer 22 may in principle be made for any conducting material or combination of materials. However, it is preferred that the material is a good conductor and relatively inert towards chemical attack of other materials present, such as the resin, as well as air and water. Preferably at least one of the cover layers 24 and the contact-enhancing layer 22 comprise a metal or a combination of materials wherein at least one component is selected from the group consisting of copper, steel, stainless steel, aluminium, nickel, chromium, tin and silver. The most preferred material being stainless steel due to availability of suitable flexible, loose, non-woven materials.

With regard to the conducting metal ribbon 20, the cover layer 24, the contact-enhancing layer 22 and the electrical conductor, the optional hereinbefore mentioned, combination of materials may constitute a homogeneous mixture or an inhomogeneous mixture. Examples of homogeneous mixtures are solid solution alloys, such as brass, Cu—Ni-systems and Cr—Fe-systems, etc., but systems having more than two species are also included such as e.g. some steels. Inhomogeneous mixtures includes inhomogeneous materials on a micro as well as on a macro scale. Examples of inhomogeneous materials are:

Layered structures, such as sandwich structures, coated materials or multilayered structures, e.g. silver coated tin or copper, which may greatly enhance the conductivity and/or reduce the contact resistance compared to tin or copper, respectively Structures with particulate integrated matter, such as a metal with a filler or a polymer with a particulate conducting matter, such as carbon black, metal particles (e.g. steel, Fe, Cu, Al)

Structures comprising fibres, such as fibre-reinforced plastic or other fibre composite materials; if the matrix material is conducting, the fibres may be any type of fibres, such as glass fibres (due to price), aramid fibres or carbon fibres (due to high strength and/or conducting property), but carbon fibres are preferred; if the matrix material is not conducting, carbon fibres are preferred due to the conducting properties of carbon fibres; the fibres may be coated (e.g. with nickel or another metal) to enhance the conductivity and/or reduce contact resistance).

Structures having a material with more than one phase, such as many steels, stainless steel and a wide range of alloys comprising the above-mentioned metals, are also comprised by the present invention.

In FIG. 8 to FIG. 11 cross sections of a number of preferred embodiments of members for potential equalising between a spar of a wind turbine blade 44 and a lightning conductor cable 30 are shown. The final carbon fibre slab 46 and elements of the members for potential equalising are shown in an exploded view to enhance clarity, whereas in real spars and members for potential equalising, the elements should be closely packed and may even to some degree extend into one or more of the other elements.

The spar 44 has a leading edge side 40 and a trailing edge side 42. It is preferred to position the lightning-conducting cable 30 near the trailing edge side 42 of the spar 44 as more space is available in the trailing edge side inside the wind turbine blade. However, other possible positions for the lightning cable 30 exist such as e g. on the leading edge side, in the blade wall or on the outer side of the blade.

The spars 44 in FIG. 8 to FIG. 11 comprise electrically conducting material, such as carbon fibres, at least in the final (i.e. outmost) layer, such as the outmost carbon fibre slabs 46. The members for potential equalising are shown with three layers, namely a contact-enhancing layer 22, a conducting metal ribbon 20 and a cover layer 24. However, other types of members for potential equalising according to the invention may also be used, i.e. members having one, two or more than three layers.

The member for potential equalising is connected to the conducting member in respect of which the spar is to be potential-equalised. The connection may involve a clamp or equivalent as indicated in FIG. 9, FIG. 10 and FIG. 11 or it may be connected by other means such as by winding the electrical conductor 10 around the conducting member 30 or by an adhesive.

Figure 10:
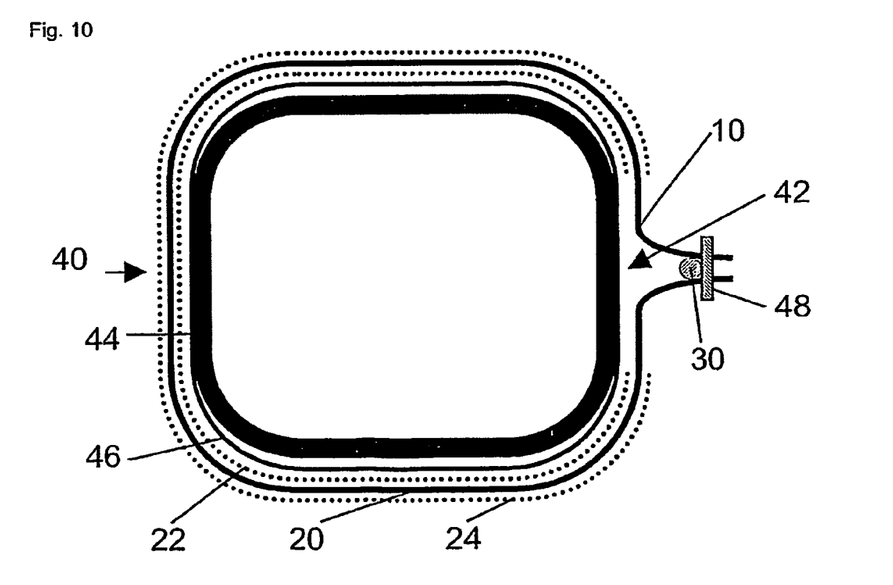
FIG. 10 shows a preferred embodiment of a member for potential equalising of a spar in a wind turbine blade.
Figure 11:
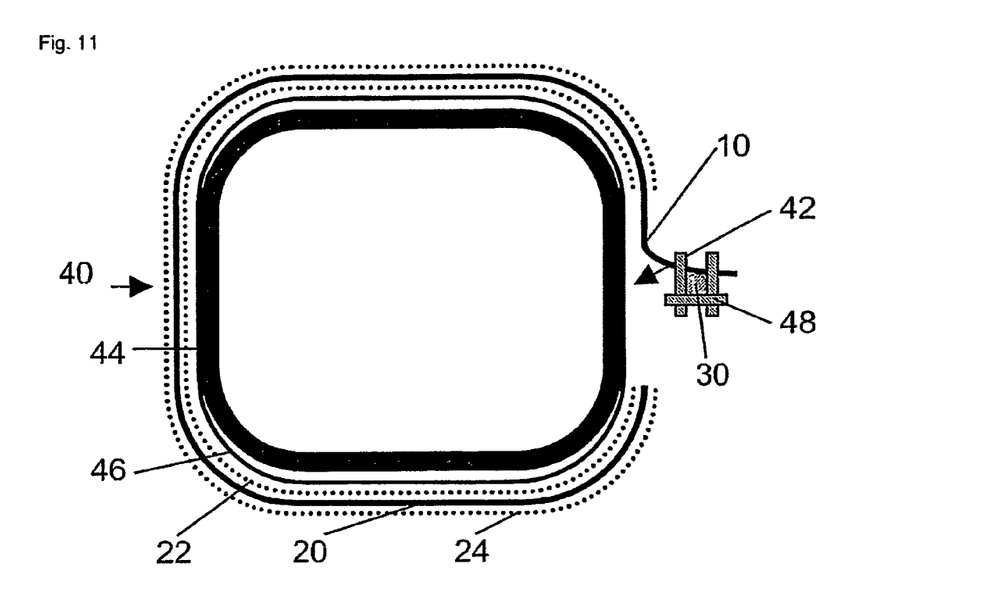
FIG. 11 shows a preferred embodiment of a member for potential equalising of a spar in a wind turbine blade.

The member for potential equalising may encircle the spar or another conducting member to be potential equalised as indicated in FIG. 10 and FIG. 11. This is particularly advantageous when the spar is relatively small, such as near the tip of the spar, or when all the sides of the spar comprise conducting material, such as carbon fibres.

Figure 9:
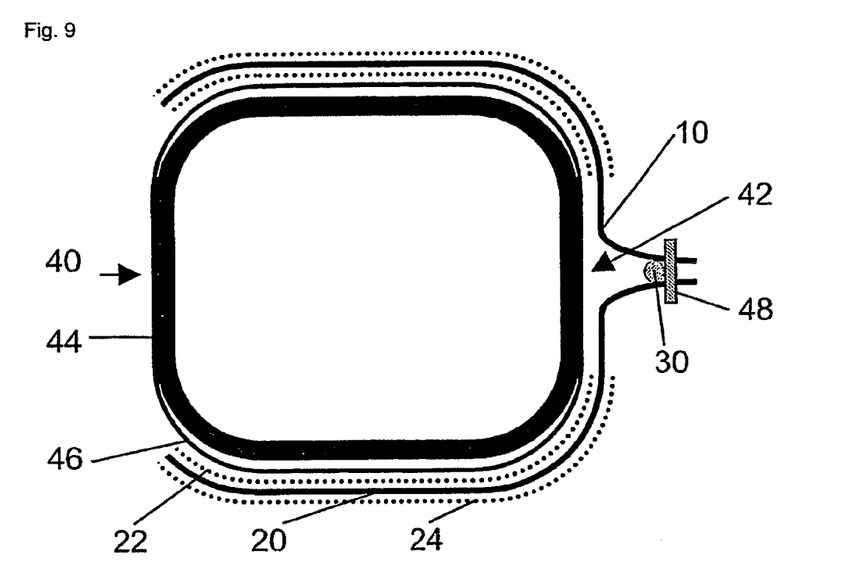
FIG. 9 shows a preferred embodiment of members for potential equalising of a spar in a wind turbine blade.

On the other hand, the member for potential equalising may cover only a part of the rim of the circumference of the spar as indicated in FIG. 8 and FIG. 9. This is advantageous in that the members for potential equalising may be easier to apply, i.e. prevent wrinkles, and save material and thereby weight and/or expenses for the members for potential equalising.

The typical orientation of carbon fibres in spars is at least partially but typically substantially in the length direction of the spar. Hence, the members for potential equalising in FIG. 8 to FIG. 11 should be oriented substantially orthogonal to at least some of the carbon fibres of the carbon fibres of the spar. As the conductivity of the carbon fibres orthogonal to the length direction is substantially lower than the conductivity in the length direction, the orientation of the member for potential equalising shown in FIG. 8 to FIG. 11 will enhance the potential equalising within the spar substantially compared to a point contact only having contact with a few carbon fibres in the surface of the conducting member. This corresponds to what is shown in FIG. 1 and is highly advantageous compared to a point contact or a line contact parallel to the length of the carbon fibres.

The members for potential equalising shown in FIG. 9 and FIG. 11 have two contact parts, namely a first contact part connected to the spar and a second contact part connected to the second conducting member. This design may be advantageous as the precision requirements for the contact parts are generally low.

The members for potential equalising shown in FIG. 8 and FIG. 10 have three contact parts. In FIG. 8, the contact parts towards the ends of the member 2 for potential equalising are connected to the spar and the centre contact part is connected to the conducting member for potential equalising. Whereas in FIG. 10, the centre contact part is connected to the spar and the contact parts towards the ends of the member for potential equalising are connected to the conducting member. The design in FIG. 10 allows for two possible current paths and hence represents a relatively robust design. The design in FIG. 8 may in some cases provide a simple connection to the conducting member.

The sketched embodiments shown in FIG. 8 and FIG. 9 are particularly useful when only the sides of spar (here depicted upwards and downwards, but other orientations are also within the scope) comprise conducting fibres. The left and right sides, which are not equally well potential-equalised, may e.g. comprise other fibres, such as glass and/or aramid fibres reinforce plastic, wooden material or other non-conducting materials.

Figure 12:
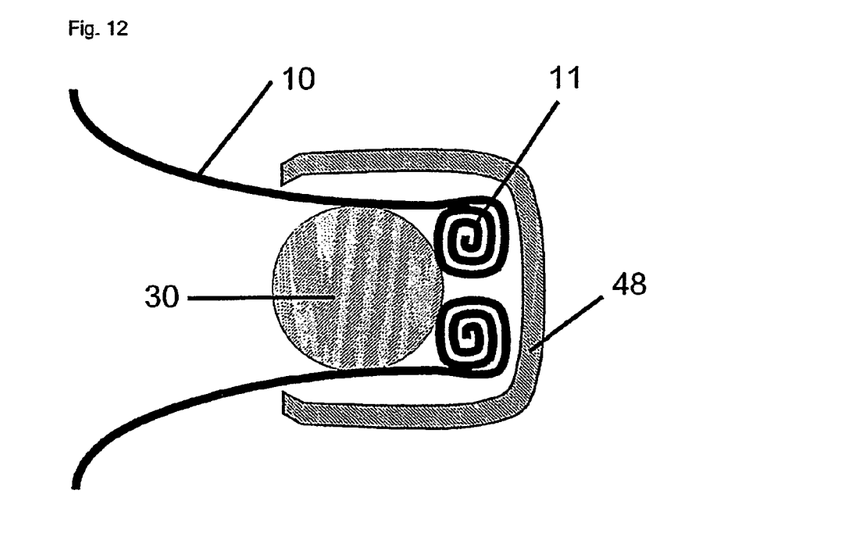
FIG. 12 shows a cross section of a preferred embodiment of a connection with a clamp.

In FIG. 12, a cross section of a preferred embodiment of a connection between a ribbon-shaped electrical conductor 10 and a lightning conductor cable 30 is shown. The end(s) of the ribbon-shaped electrical conductor 10 extending away from the clamp 48 is connected to a first conducting member. This first conducting member is not shown, but the situation may e.g. be similar to that shown in FIG. 9 or FIG. 10. The ends of the ribbon-shaped electrical member 10 facing towards the lightning conductor cable 30 and the clamp 48 may preferably be rolled up to form a roll 11 having an axis substantially parallel to the lightning conductor cable 30. Then a C-clam 48 or another appropriate clamp is applied to ensure a safe and well-conducting connection between the rolls 11 and the lightning conductor cable 30. Finally, the clamp is secured, e.g. by pressing together the sides with a suitable tool, such as e.g. a hydraulic press, a pair of nippers, etc.

This embodiment is particularly advantageous, since the electrical member may not slip out at least partially due to the rolled section and the rolled part will conform very well to the shape of the lightning conductor cable 30. In this situation, the second contact part of the member for potential equalising may be considered to be either the end of the ribbon-shaped electrical conductor 10, the rolled part of the ribbon-shaped electrical conductor 11, the clamp 48 or any combination of two or more of the listed parts. However, all these interpretations are within the scope of the invention.

Even though the connection showed in FIG. 12 corresponds to a case similar to the situation in FIG. 9, a similar approach may be used for the connection of only one ribbon-shaped electrical conductor to a second conducting member, such as a lightning conductor cable.

A wide range of other methods of connecting a ribbon shaped electrical conductor 10 to a lightning conductor cable exists, such as e.g. a clamp with two flat plated locked onto the ribbon, optionally with the ribbon being secured by a member going through a hole in the clamp and the ribbon or any other method known within the art.

Figure 13:
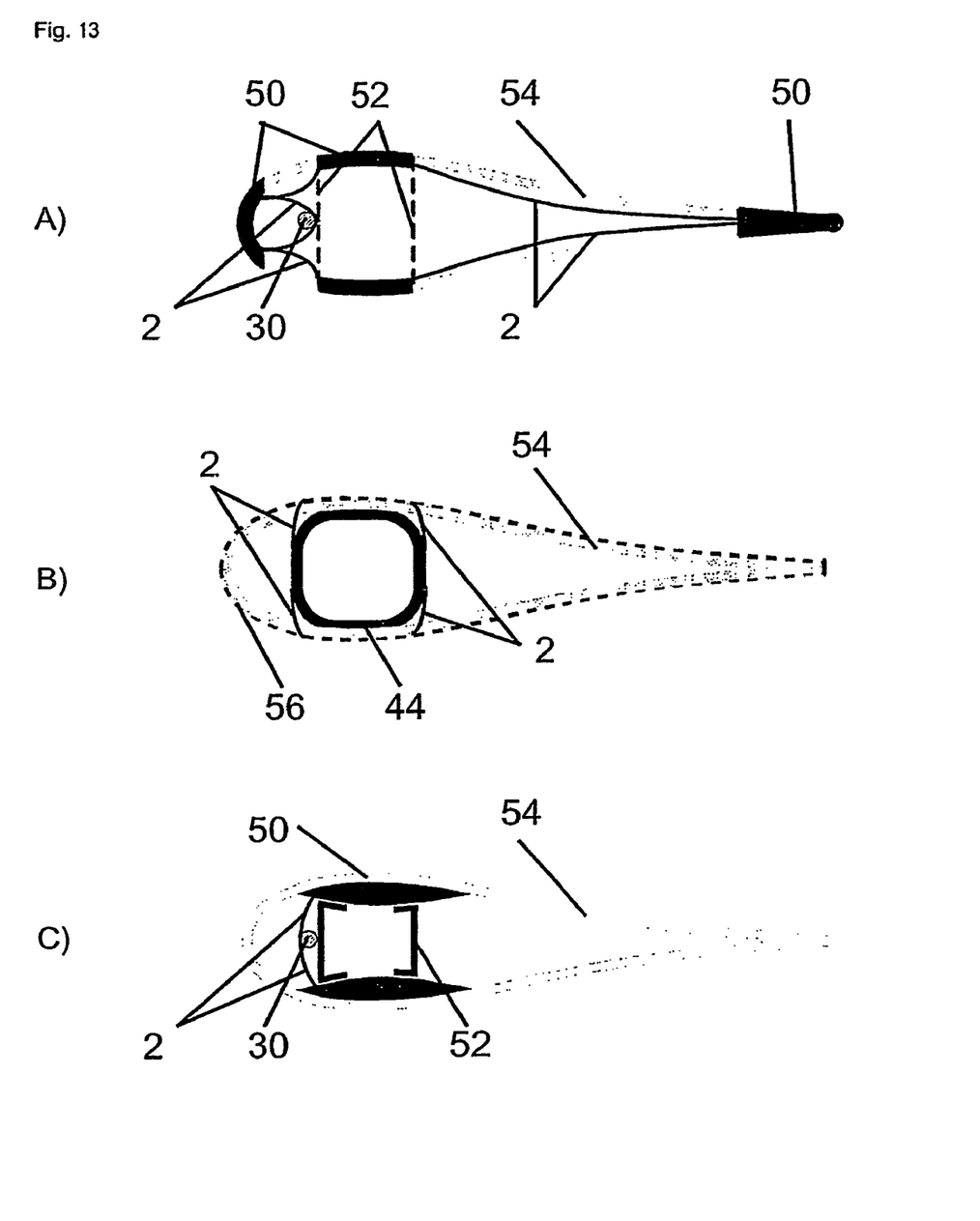
FIG. 13 shows various designs of cross sections of wind turbine blades with members for potential equalising.

FIG. 13 shows schematic cross-sections of wind turbine blades according to the invention. Typically, a number of members 2 for potential equalising according to the invention will be present in a wind turbine blade according to another aspect of the invention. If more than two conducting members are present in the cross-section of the wind turbine blade, one or more members for potential equalising according to the invention may connect these members. These members 2 for potential equalising may optionally be arranged in groups in substantially the same plane orthogonal to the length of the wind turbine blade. This is particularly advantageous in the preferred embodiment shown in FIG. 13A, where several conducting members 50, which are unconnected, are present in the wind turbine blade. The conducting members may e.g. be strips comprising carbon fibres and/or support members comprising carbon fibres and/or one or more lightning conductors such as lightning conductor cable(s) 30 or a blade-wall-type lightning conductor and/or any other type of conducting member mentioned hereinbefore or hereinafter. The wind turbine blade wall 54 may e.g. comprise wood, polymer, glass-fibre-reinforced plastic or carbon fibre plastic.

Internal support members 52 will typically be present unless a structure with a load-bearing spar 44 is used. Internal support members 52 may also advantageously be connected by members for potential equalising to the conducting members 50, if the support members comprise conducting material such as carbon fibres.

Lightning conductor may for example by an internal or external lightning conductor cable or a blade-wall-type conductor, such as a conducting mesh or sheet positioned at or near the surface of the blade wall. The lightning conductor should be connected to one or more lightning receptors (not shown) by a connection, which is capable of transferring the energy of the lightning without substantial damage. Such connections may constitute members for potential equalising according to the invention if the electrical conducting member 10 has sufficient cross section to carry the lightning current. It was found that for an electrical conducting member 10 substantially consisting of copper, a cross section of about at least 50 mm$^2$ was sufficient for a member for potential equalising according to the invention to transfer the energy of a lightning. It is particularly advantageous to use members for potential equalising according to the present invention to transferring of the lightning current when the conducting member acting as the receptor and/or the lightning conductor comprise carbon fibres as indicated in FIG. 13A. Here, the reinforcements 50 comprising carbon fibres may act as a receptor as they are positioned in the blade wall. It is therefore advantageous to use members for potential equalising, which are capable of transferring a lightning current to the other conducting members and/or to one or more lightning conductors.

As discussed elsewhere, the transfer of current from carbon fibres to another conductor usually involves a considerable contact resistance and hence would lead to an unacceptable local heating of the structure near the point of contact during transfer of the lightning current. This is prevented or at least the effect is considerably reduced with the members for potential equalising according to the present invention.

In FIG. 13B, a wind turbine blade design with a spar 44 comprising carbon fibres is used. Such a wind turbine blade may be equipped with a lightning conductor of the blade-wall type (indicated as 56 in FIG. 13B), a lightning cable (indicated as 30 in FIG. 8 to FIG. 11) or a combination of two or more lightning conductors (not shown). If the turbine blade design with a spar is used and carbon fibres are only present in the spar, then the carbon fibres are not likely to be stoked directly by lightning. The members for potential equalising therefore typically need not be able to transfer the current of a lightning but only the very small current needed for potential equalising. However, if a combined lightning conductor strategy is chosen, i.e. both the lightning conductor and the spar will conduct a significant part of the lightning current, more current will be transferred in the members for potential equalising and hence the cross section of the electrical conducting member should be larger.

FIG. 13C shows a blade having two conducting reinforcement slabs, such as carbon-fibre-reinforced plastic, positioned at the inner side of the blade wall. Here these slabs need to be potential-equalised by members 2 for potential equalising according to the invention relative to each other and to any lightning conductor (here a lightning conductor cable 30, but other types of lightning conductors are also feasible). The slabs are supported by the U-shaped support members 52, which may or may not comprise electrically conducting material, such as carbon fibres or a metal. If the support members 52 are conducting, then some of the members for potential equalising may not be needed.

In FIG. 13D, a wind turbine blade having two I-shaped conducting reinforcement members 50 incorporated is shown. These members should preferably to be potential-equalised relative to each other as well as to any optional lightning conductor.

In FIG. 13E is seen a blade wherein two reinforcement members each having two conducting reinforcement slabs 50 connected by supporting members 52. Again members 2 for potential equalising should preferably connect all of the conducting members including lightning conductors.

A person skilled in the art is based on these examples able to derive a range of other designs and combinations of wind turbine blades within the scope of the invention.

Figure 14:
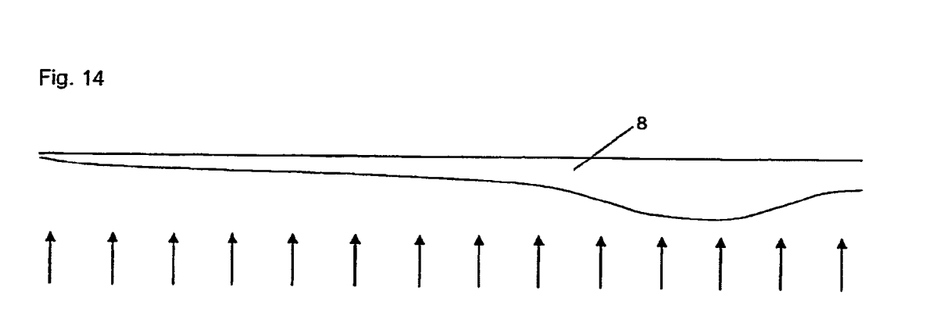
FIG. 14 shows positioning of members for potential equalising along the length of a wind turbine blade.
Figure 15:
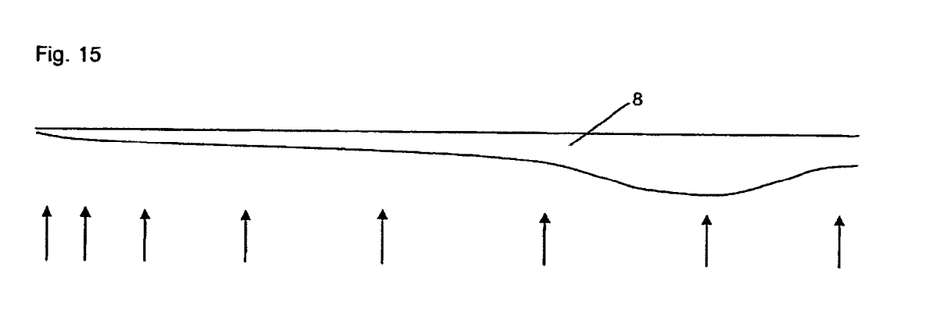
FIG. 15 shows another positioning of members for potential equalising along the length of a wind turbine blade.

The resistance of the conducting members in a wind turbine blade may be very different and to realise a reliable potential equalisation it is therefore necessary to use more than one point of potential equalising along the length of the blade. In FIG. 14 and FIG. 15 examples of positioning of members or groups of members (cf. discussion regarding FIG. 13A and FIG. 13B above) for potential equalising along the length of wind turbine blades 8 are given. The positioning of the members or groups of members is indicated with arrows and should only be considered as indicative.

In FIG. 14, the members or groups of members are separated by substantially the same distance. This provides for a simple design, and the manufacturing and/or applying of the members may relatively easy be automated.

In FIG. 15, at least some of the members or groups of members indicated by the arrows are separated by different distances. The likelihood of lightning strike varies significantly along the length of the blade with the tip-end generally being more prone to being hit As the potential differences and gradients generally speaking will be greater near the point of the lightning strike, a more efficient potential equalising is required in areas most likely to be hit. By increasing the distance between the members or group of members for potential equalising in areas less likely or unlikely to be hit by lightning, the total number of members for potential equalising may be reduced. Expenses and time may therefore be saved with the same or even better protection of the blade.

The optimum distance between the members or group of members for potential equalising depends on a number of factors such as one or more of: the type of lightning protection, the type of lightning receptors, the material of the blade and conducting members, the size of the blade, the geographical site, etc. Modelling results suggest that the members or group of members should be positioned with a distance of between about 1 to 10 meters, preferably between 2 to 7 meters, except close to the tip where the members of potential equalising may be positioned even closer.

A member for potential equalising according to the invention may be manufactured either as a separate member, which may later be applied, or on-site, directly on the conducting members to be connected.

A preferred method for manufacturing a member for potential equalising comprises the following steps:

optionally providing a contact-enhancing layer (24) at and/or near a first contact part (12), providing a conducting metal ribbon (20) at least in said first contact part (12), providing an electrical conductor (10), optionally providing a cover layer (24) at and/or near said first contact part (12), and providing a second contact part (14).

This method is particularly suited if a number of equivalent members for potential equalising is needed. Furthermore, the method is simple and suited for automation.

The order of the steps involved in manufacturing of the first contact part may be reversed, thereby providing an upside-down first contact part. This may be advantageous dependent on the actual orientation of the conducting members to be potential equalised.

A preferred method for on-site manufacturing of a member for potential equalising according to the invention comprises the following steps:

providing a first conducting member to be potential equalised, optionally providing a contact-enhancing layer (24) at least partially in contact with said first conducting member (4), providing a conducting metal ribbon (20) in contact with at least a part of said first conducting member (4) and/or said optional contact-enhancing layer (12), providing an electrical conductor (10)
optionally providing a cover layer (24) in contact with said conducting metal ribbon (20), and
providing a second contact part (14).

The first conducting member should preferably comprise carbon fibres to realise the full advantage of the invention. The method is particularly suitable if a low number of members for potential equalising is needed but may also be used for larger number of members for potential equalising In the case of potential equalising of wind turbine blades, the size and/or type of the members for potential equalising may vary considerably along the length of the blade. This may favour the present method of manufacturing. The method may be used manually or automated.

Both the above methods may be simplified if the conducting metal ribbon 20 and the electrical conductor 10 are integrated as discussed above. In this case, the two steps of providing the individual members may be replaced by a single or combined step.

In a preferred embodiment of the above methods at least one of the optional contact-enhancing layer and the optional cover layer is a prepreg, a semi-preg or a dry loose non-woven material such as a web, a veil or a fleece material, preferably a single-side-impregnated semi-preg.

In some cases, it may be advantageous to add further resin and/or adhesive in contact with the contact-enhancing layer 22 and/or said conducting metal ribbon 20 and/or said cover layer 24. This may e.g. be relevant if the member for potential equalising does not contain sufficient resin or if the member needs to be temporarily fixed to a conducting member during manufacturing.

In many cases, the member for potential equalising may advantageously be pre-consolidated after manufacturing. By pre-consolidation is meant a process whereby the porosity, which may be caught inside the member, is removed or at least significantly reduced. The process may be associated with a partial curing of the resin of the member for potential equalising. The pre-consolidation may be advantageous as the process increases the reliability and reproducibility of the member for potential equalising. Typically, pre-consolidation is used on members for potential equalising manufactured separated from the conducting members to be potential-equalised, but in some cases pre-consolidation may be performed when the member for potential equalising is connected to the conducting members.

Finally, the member for potential equalising should preferably be cured, if any part of it comprise a resin. This may or may not take place together with the curing of at least one other part of the wind turbine blade such as one or more of the conducting members, i.e. by co-curing. The curing may or may not be in vacuum or under an external pressure (e.g. provided by a hydraulic press), however, it is preferred to cure or co-cure the member for potential equalising under reduced pressure, such as in vacuum.

The invention claimed is:

1. A member for potential equalizing between a first conducting member and a second conducting member of a wind turbine blade, said member for potential equalizing comprising:
    an electrical conductor,
    a first contact part for providing a potential equalizing connection between said first conducting member of said wind turbine blade and said electrical conductor, and
    a second contact part for providing a potential equalizing connection between said second conducting member of said wind turbine blade and said electrical conductor,
    wherein said first contact part is shaped substantially as a ribbon and said first conducting member comprises carbon fibres.

2. A member for potential equalizing according to claim 1, wherein said first contact part comprises a conducting metal ribbon.

3. A member for potential equalizing according to claim 2, wherein said conducting metal ribbon has a width of more than 1 cm.

4. A member for potential equalizing according to claim 2 wherein said first contact part further comprises a contact-enhancing layer connected to a side of said conducting metal ribbon to be oriented towards said first conducting member.

5. A member for potential equalizing according to claim 4, wherein said contact-enhancing layer extends beyond the conducting metal ribbon in at least one direction in the plane of the conducting metal ribbon.

6. A member for potential equalizing according to claim 2, wherein said first contact part further comprises a cover layer connected to the-a_side of said conducting metal ribbon to be oriented away from said first conducting member.

7. A member for potential equalizing according to claim 6, wherein said cover layer extends beyond the conducting metal ribbon in at least one direction in the plane of the conducting metal ribbon.

8. A member for potential equalizing according to claim 4, further having, on a side of said conducting metal ribbon opposite to said contact-enhancing layer, a cover layer, wherein said contact-enhancing layer and said cover layer extend beyond the conducting metal ribbon in at least two directions in the plane of the conducting metal ribbon and said contact-enhancing layer extends beyond said cover layer in at least two directions in the plane of the conducting metal.

9. A member for potential equalizing according to claim 4, wherein said contact-enhancing layer is a flexible and conductive material, which comprises a loose non-woven material.

10. A member for potential equalizing according to claim 4, further having, on a side of said conducting metal ribbon opposite to said contact-enhancing layer, a cover layer; and wherein one of said cover layer or said contact-enhancing layer is at least partially impregnated with a resin.

11. A member for potential equalizing according to claim 1, wherein said second contact part comprises a clamp for connecting to a lightning conductor.

12. A member for potential equalizing according to claim 1, wherein said second contact part is substantially equivalent to said first contact part.

13. A member for potential equalizing according to claim 1, wherein said electrical conductor is a conducting metal ribbon.

14. A member for potential equalizing according to claim 13, wherein said first contact part is a conducting metal ribbon which is one of a part of an extension of said conducting metal ribbon of said electrical conductor.

15. A member for potential equalizing according to claim 2, wherein said conducting metal ribbon and said electrical conductor are good conductors and relatively inert.

16. A member for potential equalizing according to claim 4, further having, on a side of said conducting metal ribbon opposite to said contact-enhancing layer, a cover layer: and wherein at least one of said cover layer or contact- enhancing layer is a good conductor and relatively inert.

17. A member for potential equalizing according to claim 15:
    wherein said first contact part further comprises a contact-enhancing layer connected to a side of said conducting metal ribbon to be oriented towards said first conducting member and a cover layer connected to a side of said conducting metal ribbon to be oriented away from said first conducting member, and wherein at least one of said conducting metal ribbon, cover layer, said contact- enhancing layer and said electrical conductor comprises a combination of materials.

18. A member for potential equalizing according to claim 17, wherein said combination of materials is inhomogeneous, and is selected from one of:

a layered structure, selected from one of silver-coated tin or silver-coated copper, a structure with particulate integrated material, selected from one of a metal with a filler, polymer with carbon black, or metal particles, or a structure comprising fibres, selected from one of glass fibres, aramid fibres or carbon fibres.

19. A member for potential equalizing according to claim 1 further comprising at least one further contact part for providing a potential equalizing connection between one or more further conducting members of said wind turbine blade and said electrical conductor.

20. A member for potential equalizing according to claim 1, wherein said first contact part is adapted to provide a potential equalizing connection to said first conducting member, and wherein said first conducting member comprises fibres selected from one of reinforcement fibres in a carbon-fibre or glass-fibre reinforced plastic.

21. A member for potential equalizing according to claim 1, wherein said conducting metal ribbon is oriented substantially orthogonal to at least some of the carbon fibres of said first conducting member.

22. A wind turbine blade comprising a member for potential equalizing according to claim 1, wherein said first conducting member is connected to said first contact part of said member for potential equalizing, and a second conducting member connected to said second contact part of said member for potential equalizing.

23. A wind turbine blade comprising as claimed in claim 22, and further including a number of said members for potential equalizing which are positioned at one of regular or irregular intervals along a length of said wind turbine blade.

24. A method for manufacturing of a member for potential equalizing according to claim 1, comprising the steps of:

providing a contact-enhancing layer at or near said first contact part, providing a conducting metal ribbon at least in said first contact part, providing the electrical conductor, providing a second contact part.

25. A method for manufacturing of a member for potential equalizing according to claim 1, comprising the steps of:

providing said first conducting member to be potential-equalized, providing a contact-enhancing layer at least partially in contact with said first conducting member, providing a conducting metal ribbon in contact with at least a part of one of said first conducting member andlor said optional-contact-enhancing layer, providing said electrical conductor, and providing a second contact part.

26. A method for manufacturing according to claim 24, wherein said conducting metal ribbon and said electrical conductor are integrated.

27. A method for manufacturing of a member for potential equalizing according to claim 1, comprising the steps of:

providing a contact-enhancing layer at or near said first contact part, providing a conducting metal ribbon at least in said first contact part, providing the electrical conductor, providing a cover layer at or near said first contact part, and providing a second contact part.

28. A method for manufacturing according to claim 27 further comprising the step of:

providing one of a resin or an adhesive in contact with one of said contact- enhancing layer, said conducting metal ribbon, or said cover layer.

29. A method for manufacturing according to claim 24, further comprising the step of:

pre-consolidating said member for potential equalizing.

30. A method for manufacturing according to claim 24, further comprising the step of:

curing said member for potential equalizing, wherein said member for potential equalizing and at least a part of said wind turbine are cured together.

31. A member for potential equalizing according to claim 2, wherein said conducting metal ribbon is one of a flexible sheet or a flexible mesh.

32. A member for potential equalizing according to claim 15, wherein one of said conducting metal ribbon or said electrical conductor comprises a metal selected from the group consisting of copper, steel, stainless steel, aluminum, nickel, chromium, tin and silver.

33. A member for potential equalizing according to claim 15, wherein one of said conducting metal ribbon or said electrical conductor comprises copper.

34. A member for potential equalizing according to claim 16, wherein one of said cover layer or said contact-enhancing layer comprises a metal selected from the group consisting of copper, steel, stainless steel, aluminum, nickel, chromium, tin and silver.

35. A member for potential equalizing according to claim 16, wherein one of said cover layer or said contact-enhancing layer comprises stainless steel.

36. A member for potential equalizing according to claim 20, wherein a significant part of the conductance of said first conducting member is provided for by a carbon fibre component of said first conducting member.

37. A member for potential equalizing according to claim 21, wherein said conducting metal ribbon is oriented substantially orthogonal to the main orientation of the carbon fibres of said first conducting member.

38. A method for manufacturing according to claim 27 wherein at least one of said contact-enhancing layer and said cover layer is one of a prepreg, a semi-preg or a dry loose non-woven material.

39. A method for manufacturing of a member for potential equalizing according to claim 1, comprising the steps of:

providing said first conducting member to be potential-equalized, providing a contact-enhancing layer at least partially in contact with said first conducting member, providing a conducting metal ribbon in contact with at least a part of one of said first conducting member or said contact-enhancing layer, providing said electrical conductor, providing a cover layer in contact with said conducting metal ribbon, and providing a second contact part.

40. A method for manufacturing according to claim 27, further comprising the step of:

curing said member for potential equalizing by a co-curing process wherein said member for potential equalizing and at least a part of said wind turbine are cured together.

41. A method for manufacturing of a wind turbine blade having a member for potential equalizing according to claim 22, the method comprising the steps of:

providing said first conducting member connected to said first contact part of said member for potential equalizing, and     providing said second conducting member connected to said second contact part of said member for potential equalizing.

\* \* \* \* \*